April 11, 1961 C. BEUCHER 2,979,610
SINGLE SIDE-BAND RECEIVER FOR RECEPTION OF
SINGLE SIDE-BAND SIGNALS BY MEANS OF
A CARRIER-WAVE FREQUENCY
Filed Sept. 24, 1957

INVENTOR
CHARLES BEUCHER
BY
AGENT

United States Patent Office 2,979,610

Patented Apr. 11, 1961

2,979,610

SINGLE SIDE-BAND RECEIVER FOR RECEPTION OF SINGLE SIDE-BAND SIGNALS BY MEANS OF A CARRIER-WAVE FREQUENCY

Charles Beucher, St. Brieuc, France, assignor to Telecommunications Radioelectriques et Telephoniques T.R.T. (Sociéte Anonyme), Paris, France Filed Sept. 24, 1957, Ser. No. 685,945

4 Claims. (Cl. 250—20)

This invention relates to single side-band receivers for reception of single side-band signals by means of a carrier-wave frequency. The single side-band receiver according to the invention may advantageously be used more particularly for the reception of single side-band signals which are inverted in frequency, which is important with a view to obtaining improved secrecy.

In previous single-sideband receivers, selection filters have been employed to select the carrier wave signal, the selected carrier wave signal being used to demodulate the single-sideband signal. In such receivers the carrier wave selection may occur following a frequency transposition stage. In this case, stringent requirements are to be imposed upon the selectivity of the carrier-wave selection filter, whilst for demodulation is is also frequently necessary for the selected carrier-wave frequency to be amplified in a carrier-wave amplifier.

The object of the invention is to provide an embodiment of such a single side-band receiver in which inter alia these difficulties are obviated.

According to the invention, the single side-band demodulator stage has connected to it a local oscillator of which the frequency is shifted with respect to the incoming carrier frequency at least through a frequency distance equal to the band-width of the single side-band signal, the output circuit of the single side-band demodulator stage being connected through a bandpass filter having a tuning frequency equal to the frequency distance between the local oscillator frequency and the incoming carrier frequency to an AFC-control voltage generator for producing an AFC-control voltage, which is applied to a frequency corrector coupled to a local oscillator in the single side-band receiver.

When a single side-band signal inverted in frequency is transmitted, the frequency difference between the local-oscillator frequency and the incoming carrier frequency is preferably chosen equal to the inversion frequency, so that the low-frequency intelligence signal is derived from the output of the demodulator stage in the correct frequency position. The frequency inversion, which may be accomplished by mixing the single side-band signal with a fixed-frequency signal, causes the high-frequency and the low-frequency ends of the signal to become interchanged.

Figures 1, 2:
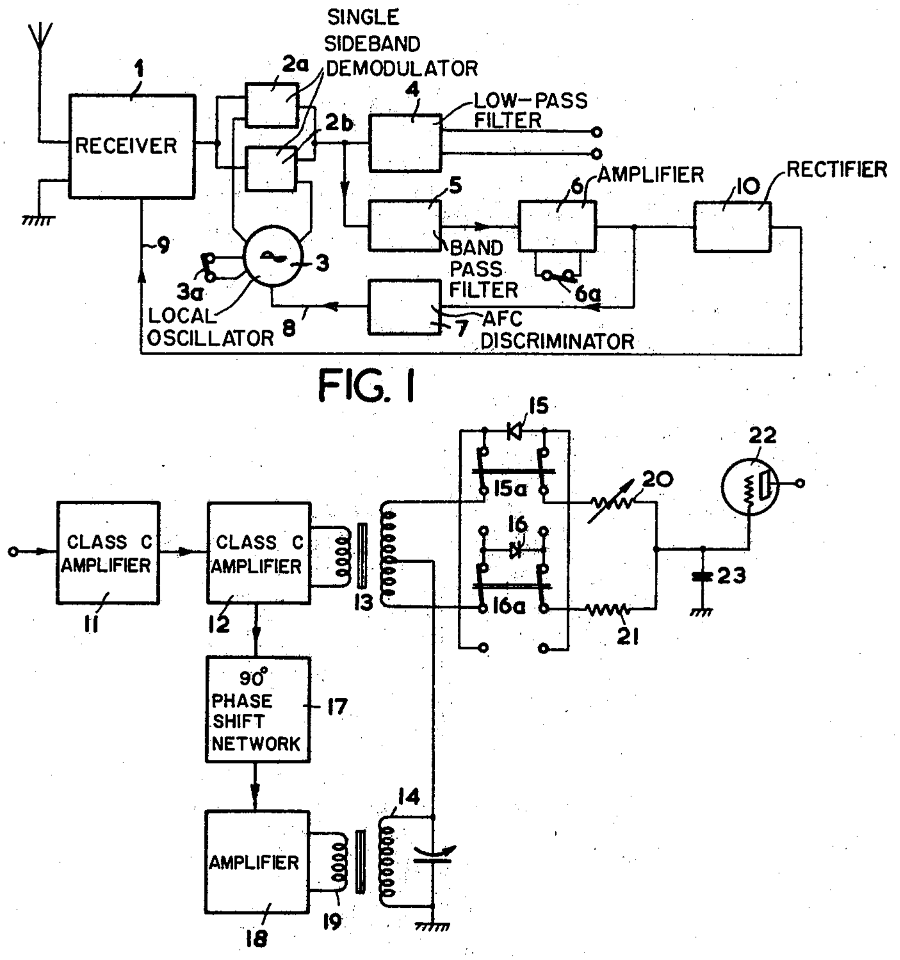
Figure 3:
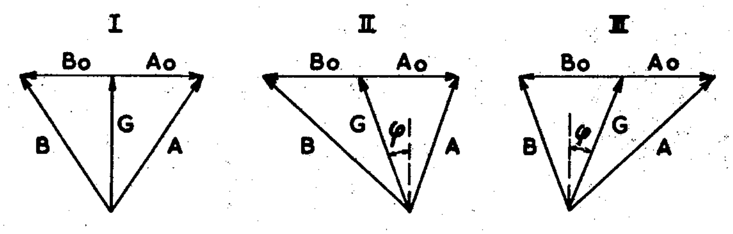

In order that the invention may be put more readily into effect, it will now be described more fully, by way of example, with reference to the accompanying drawing, in which:

Fig. 1 shows a block diagram of a single side-band receiver according to the invention, Fig. 2 shows one embodiment of a frequency discriminator which can be used as an AFC-control voltage generator in a single side-band receiver as shown in Fig. 1, and in Fig. 3 shows several vector diagrams to explain the frequency discriminator shown in Fig. 2.

The single side-band receiver according to the invention as shown in Fig. 1 is designed for reception of two single side-band signals having a common carrier frequency, the single side-band signal located in the lower frequency band being inverted in frequency.

The incoming single side-band signals are supplied through an aerial to a receiver stage 1, which comprises one or a plurality of frequency-transposition stages and amplifying stages. If the carrier-wave frequency is F kc./s. and the single side-band signals have a bandwidth of *b* kc./s. for example 3 kc./s., then at the output of the receiver stage 1 there occur, in addition to the carrier-wave frequency of F kc./s., the two single side-band signals located in the frequency bands F to $(F-3)$ kc./s. and F to $(F+3)$ kc./s. As previously mentioned, the single side-band signal located in the lower frequency band $(F-3)$ kc./s. is inverted in frequency, the inversion frequency being, for example, 3 kc./s.

The signals which occur at the output circuit of the receiver stage 1 are supplied to a single side-band demodulator which for obtaining linear demodulation is designed as a push-pull mixing stage having two symmetrical elements 2*a*, 2*b*, the demodulator stage 2*a*, 2*b* having connected to it a local oscillator 3, having a frequency of $F-3$ kc./s., which is thus shifted by 3 kc./s. with respect to the incoming carrier frequency F.

With this choice of the frequency of the local oscillator 3, the following signals occur at the output of the demodulator stage 2*a*; 2*b*:

(1) Signals located in the frequency band of 0 to 3 kc./s. corresponding to the incoming signals located in the frequency band of F to $(F-3)$ kc./s.

(2) A frequency of 3 kc./s. corresponding to the carrier-wave frequency F.

(3) Signals located in the frequency band of 3 to 6 kc./s. corresponding to the incoming signals located in the frequency band of F to $(F+3)$ kc./s.

Since the signals located in the frequency band of F to $(F-3)$ kc./s. are inverted in frequency at an inversion frequency of 3 kc./s., the signals of 0 to 3 kc./s. occur in the correct frequency position, so that these signals can be supplied through a low-pass filter 4 having an upper limiting frequency of 3 kc./s. directly to a reproducing device.

If it is desired to receive the signals located in the frequency band of F to $(F+3)$ kc./s., the frequency of the local oscillator 3 is switched-over to the frequency $(F+3)$ kc./s. by means of a switch 3*a*. In this case, the low-frequency signals of 0 to 3 kc./s. derived from the output of the low-pass filter are inverted in frequency, since the signals located in the frequency band of F to $(F+3)$ kc./s. are transmitted without frequency inversion, so that between the low pass filter 4 and the reproducing device there must be arranged a frequency inverter which may be designed in known manner.

In order to obtain a fixed frequency relation between the incoming carrier frequency and the frequency of the local oscillator 3, the local oscillator 3 is controlled in AFC as a function of the carrier-wave frequency of 3 kc./s. derived from the output of mixing stage 2*a*, 2*b*. For this purpose, the output circuit of the single side-band demodulator stage 2*a*, 2*b* is connected through a bandpass filter 5, tuned to the frequency of 3 kc./s., and and an amplifying stage 6 to an AFC-control voltage generator 7 in the form of an AFC-discriminator having a tuning frequency of 3 kc./s. The AFC-discriminator supplies an AFC-control voltage which, for AFC-control, is supplied via a lead 8 to a frequency corrector, for example a reactance tube, which is coupled to the oscillator 3.

In the single side-band receiver shown, the frequency of the local oscillator 3 is thus controlled itself in AFC as a function of the carrier-wave frequency set up at the output of demodulator stage 2*a*, 2*b*, so that a correct frequency position of the frequency of oscillator 3 is ensured, whilst furthermore the design of the bandpass filter 5 is much simplified due to the carrier-wave frequency which occurs at the output of the demodulator 2*a*, 2*b* being selected in the audio-frequency range.

In addition to the specified use for AFC-control, the 3 kc./s. signal selected by means of the filter 5 is also used for level control in the embodiment shown the said 3 kc./s. signal for this purpose being rectified in a rectifier stage 10 and supplied via a lead 9 to the receiver stage 1 for control of the mutual conductance of the amplifiers present therein. In order that upon passing from reception of single side-band signals with attenuated carrier wave to single side-band signals, the carrier-wave of which is transmitted without attenuation, it may be ensured that the single side-band signals supplied to the demodulator stage 2*a*, 2*b* are not unduly attenuated as a result of the increase in level-control voltage, by providing the amplifier stage 6 with a switch 6*a* which, upon reception of single side-band signals with non-attenuated carrier wave, is closed for decreasing the amplification of the amplifying stage 6.

Fig. 2 shows an embodiment of a frequency discriminator 7 which has been found particularly advantageous for use in the single side-band receiver shown.

In this frequency discriminator, the 3 kc./s. signal selected by means of the bandpass filter 5 is supplied via a limiter comprising two class-C adjusted amplifying stages 11, 12 and a transformer 13 to a mixing stage comprising two rectifiers of opposite directions of passage indicated by 15 and 16, respectively, which are connected via series-resistors 20 and 21, respectively, to an output capacitor 23.

To produce the AFC-control voltage, the signal derived from the stage 12 is also supplied through a 90° phase-shifting network 17 and an amplifier 18 to an output transformer 19 having a secondary winding 14, tuned to 3 kc./s., which is connected to a centre tapping on the secondary winding of transformer 13. In the manner as will be explained more fully with reference to the vector diagrams of Fig. 3, an AFC-control voltage set up at the output capacitor 23 is supplied for AFC-control to the control grid of a reactance tube 22 coupled to the local oscillator 3.

If an oscillation of exactly 3 kc./s. is supplied to the described frequency detector, a voltage G (conf. Fig. 3(I)) occurs at the tuned secondary winding of transformer 14, which determines the tuning frequency of the frequency discriminator said voltage being shifted by 90° with respect to the voltages $A_0$, $B_0$ supplied through transformer 13 to the mixing stage with its rectifier cells 15, 16. Equal voltages as illustrated by the vectors A and B in Fig. 3(I) occur across the amplifier cells 15 and 16 of the frequency discriminator, so that the voltage at output capacitor 23 is zero.

If the frequency of the oscillations supplied to the frequency discriminator differs from said tuning frequency of 3 kc./s., the vector G shows a phase shift $\varphi$ with respect to the position shown in Fig. 3(I), the value and the polarity of which are dependent upon the value and the direction of the frequency deviation occurring, as illustrated in the vector diagrams of Fig. 3(II) and Fig. 3(III). In this case, the voltages on the rectifiers 15, 16 are not the same and a voltage occurs at output capacitor 23, the value and polarity of which is determined by the value and direction dependent upon the frequency deviation occurs at output capacitor 23, which voltage may be used for AFC-control.

As previously explained in the foregoing, the arrangement shown in Fig. 1 permits of receiving in a simple manner both the signals located in the frequency band of F to $(F-3)$ kc./s. and the signals located in the frequency band of F to $(F+3)$ kc./s. and for this purpose it is only necessary to vary the tuning frequency of oscillator 3 by means of the switch 3*a*. For example, if it is desired to pass from reception of the signals F to $(F-3)$ kc./s. to reception of the signals located in the frequency band of F to $(F+3)$ kc./s., the tuning frequency of oscillator 3 is adjusted from $(F-3)$ kc./s. to $(F+3)$ kc./s. by means of said switch. For AFC-control it is then also necessary to invert the polarity of the AFC-control voltage, which is effected in a simple manner by reversing the direction of passage of the rectifiers 15, 16 of the frequency discriminator by means of switches 15*a* and 16*a* as shown diagrammatically. The polarity of the AFC-control voltage can alternatively be inverted in a different manner, for example by permutation of the inputs of the frequency discriminator.

It is still to be noted that, instead of utilizing a frequency discriminator 7 as an AFC-control voltage generator, it is alternatively possible to use a phase detector comprising a mixing stage and a reference oscillator connected thereto, the tuning frequency of which is, for example, 3 kc./s. in the embodiment shown.

What is claimed is:

1. A single-sideband receiver for receiving frequency-inverted single-sideband signals, comprising a single-sideband demodulator connected to receive the single-sideband signals, a local oscillator connected to said demodulator and having a frequency of oscillation which differs from the carrier wave frequency of said single-sideband signals by an amount equal to the inversion frequency of said single-sideband signals, means for shifting the frequency of said local oscillator from one side to the other of said carrier wave frequency, a bandpass filter connected to the output of said demodulator and having a bandpass frequency equal to said inversion frequency, an automatic frequency control voltage generator connected to the output of said bandpass filter, and means connected to apply said automatic frequency control voltage to said local oscillator to control the frequency thereof.

2. A single-sideband receiver for selectively receiving two single-sideband signals having a common carrier frequency, comprising a single-sideband demodulator connected to receive the single-sideband signals, a local oscillator connected to said demodulator, a bandpass filter connected to the output of said demodulator and having a bandpass frequency equal to the frequency difference between the frequency of said local oscillator and said carrier frequency, an automatic frequency control voltage generator comprising a discriminator circuit connected to the output of said bandpass filter, means connected to apply said automatic frequency control voltage to said local oscillator to control the frequency thereof, and means for selecting said single-sideband signals comprising first switching means connected to shift the oscillation frequency of said local oscillator with respect to the carrier frequency by an amount substantially equal to the bandwidth of the received single-sideband signal, and second switching means connected in said discriminator circuit to reverse the polarity of said automatic frequency control voltage.

3. A single-sideband receiver for selectively receiving single-sideband signals having an attenuated carrier wave and having a carrier wave which is not attenuated, comprising a single-sideband demodulator connected to selectively receive said single-sideband signals, a local oscillator connected to said demodulator, means for shifting the oscillation frequency of said local oscillator with respect to the carrier frequency by an amount at least equal to the bandwidths of said single-sideband signals, a bandpass filter having a bandpass frequency equal to the frequency difference between said oscillation frequency and said carrier frequency, an amplifier, means connecting said amplifier and said bandpass filter in a series combination, means connecting said series combination to the output of said demodulator, an automatic frequency control voltage generator connected to the output of said series combination, means connected to apply said automatic frequency control voltage to said local oscillator to control the frequency thereof, and means connected to decrease the gain of said amplifier when receiving said single-sideband signal having a carrier wave which is not attenuated.

4. A receiver for receiving single-sideband signals having a continuous pilot carrier signal, said receiver comprising single-sideband demodulator means, means applying said signal to said demodulator means, oscillator means connected to said demodulator means, the frequency of said oscillator means differing from the frequency of said pilot carrier signal by an amount equal to the bandwidth of a sideband of said single-sideband signals, whereby the output of said demodulator comprises signals located in the frequency band of zero to the frequency difference between the frequencies of said oscillator and said pilot carrier signal, and a continuous difference signal having a frequency equal to said frequency difference, bandpass filter means connected to said demodulator means for selectively passing said continuous difference signal, automatic frequency control voltage generator means connected to said oscillator means to control the frequency thereof, means applying the filtered said continuous difference signal to said control voltage means, and output circuit means connected to said demodulator means.

References Cited in the file of this patent

UNITED STATES PATENTS

| | | |
|---|---|---|
| 2,207,934 | Mountjoy | July 16, 1940 |
| 2,294,100 | Travis | Aug. 25, 1942 |
| 2,389,356 | Goldstine | Nov. 20, 1945 |
| 2,407,260 | Dickenson | Sept. 10, 1946 |
| 2,571,957 | Singel | Oct. 16, 1951 |
| 2,797,314 | Eglin | June 25, 1957 |
| 2,801,332 | Vos | July 30, 1957 |
| 2,811,642 | Gabor | Oct. 29, 1957 |
| 2,836,712 | Crosby | May 27, 1958 |